(12) United States Patent
Sato (10) Patent No.: US 7,483,015 B2
(45) Date of Patent: Jan. 27, 2009

(54) IMAGE DISPLAY SYSTEM

(75) Inventor: Osamu Sato, Tokyo (JP)

(73) Assignee: ARUZE Corp., Koto-ku, Tokyo (JP)

( * ) Notice: Subject to any disclaimer, the term of this patent is extended or adjusted under 35 U.S.C. 154(b) by 582 days.

(21) Appl. No.: 11/054,617

(22) Filed: Feb. 10, 2005

(65) Prior Publication Data

US 2005/0195127 A1  Sep. 8, 2005

(30) Foreign Application Priority Data

Feb. 17, 2004 (JP) ............................. 2004-040354

(51) Int. Cl.
*G09G 5/00* (2006.01)
(52) U.S. Cl. .................. 345/156; 345/158; 359/630
(58) Field of Classification Search ......... 345/156–158, 345/7–9, 87; 359/630–631
See application file for complete search history.

(56) References Cited

U.S. PATENT DOCUMENTS 5,528,263 A * 6/1996 Platzker et al. .............. 345/156
5,694,142 A * 12/1997 Dumoulin et al. ............... 345/9
6,545,663 B1 * 4/2003 Arbter et al. ................. 345/158
7,098,891 B1 * 8/2006 Pryor .......................... 345/158
7,176,890 B2 * 2/2007 Kitaguchi et al. ........... 345/158
2003/0210229 A1 * 11/2003 Nishimura et al. .......... 345/157

FOREIGN PATENT DOCUMENTS

JP  2001-273092  10/2001

* cited by examiner

Primary Examiner—Richard Hjerpe
Assistant Examiner—Kimnhung Nguyen
(74) Attorney, Agent, or Firm—McGinn IP Law Group, PLLC (57) ABSTRACT

It is disclosed the image display system having a projecting device 30 for projecting a first image; a transparent screen device 10 on a rear plane of which the first image projected by the projecting device 30 is focused and on a front plane of which a second image near the first image indicated by an indication portion P is reflected; an image taking device 40 for taking a rear plane image of the screen device 10 and outputting image data thereof including the second image of the indication portion P; and a position detection device 50 for detecting a position indicated by the indication portion P based on the rear plane image included in the image data.

14 Claims, 8 Drawing Sheets

IMAGE DISPLAY SYSTEM

CROSS-REFERENCE TO THE RELATED APPLICATION (S)

This application is based upon and claims a priority from the prior Japanese Patent Application No. 2004-040354 filed on Feb. 17, 2004, the entire contents of which are incorporated herein by reference.

BACKGROUND OF THE INVENTION

1. Field of the Invention

The present invention relates to an image display system. In particular, the present invention relates to an image display system through which an image is displayed on an image-formation device such as a screen on which an image is displayed and a position of an image formed due to that a user indicates such position can be detected when the user indicates the position.

2. Description of Related Art

Recently, it is spread and progressed an image display technology to conduct explanations to many people while displaying a text formed through a PC (personal computer) on a screen by utilizing a liquid crystal projector. In a case that such explanations are done, to assist comprehension of audience, it is general that an explainer/an assistant indicates description, figures, tables and the like in the image displayed on the screen by an indicating tool such as an indicating stick or a beam pointer corresponding to explanation.

In this indication, there will be a case that it is requested to detect a position indicated by the above indicating tool. For example, there will be conceivable a case that various image processes to assist comprehension of audience are desirably done based on the above indication as a trigger, so that a color of sentence indicated by the indicating tool is changed and the sentence is displayed with highlights or a figure indicated by the indicating toll is enlarged and displayed.

As the technology to realize the above request, it is proposed in Unexamined Japanese Publication No. 2001-273092 a technology that the indicated position within an image area displayed on the screen is detected by taking the image of the image area and by conducting an edge process of the image obtained.

In the above case, it can be adopted a method to extract an outline of the indicating tool by conducting an image process of images taken from the screen and the indicating tool. However, it is requested larger machine power to conduct the image process according that the area to which the image process is conducted becomes wider. And if a large image display is done through the liquid crystal projector, it is requested a considerably large machine power, thereby there is a problem that cost thereof increases.

Further, although it is conceivable a method to detect a top position of the indicating toll by utilizing an infrared sensor, infrared ray emitted from the infrared sensor reflects on a portion other than the top portion of the indicating tool, thus it is difficult to determine whether or not the infrared ray is reflected on the top portion of the indicating tool. As a result, there will also exist a problem that it is very difficult to correctly obtain the position information of the indicating tool.

SUMMARY OF THE INVENTION

The present invention has been done to dissolve the above problems and has an object to provide an image display system through which a position of an indication portion can be correctly detected without utilizing machine power.

In order to accomplish the above object, according to one aspect of the present invention, it is provided an image display system comprising: a projector for projecting a first image;

a transparent screen on a rear plane of which the first image projected by the projector is focused and on a front plane of which a second image formed by an indication portion indicating the first image is reflected;

an image taking device for taking a rear plane image of the second image and outputting image data thereof; and a position detector for detecting a position indicated by the indication portion based on the image data.

Here, the second image may be an image which is seen on the front plane of the transparent screen or may be a dark area formed on the transparent screen by shutting light through the indication portion, that is a shadow.

According to the image display system, the transparent screen can be utilized as both an image display device and an acceptance device for accepting an input from the user, thereby simplification of the system can be realized.

And according to another aspect of the present invention, it is provided an image display method comprising steps of:

projecting a first image;

focusing the first image projected by the projector on a rear plane of a transparent screen and for reflecting a second image formed by an indication portion indicating the first image on a front plane of the transparent screen;

taking a rear plane image of the second image and for outputting image data thereof; and detecting a position indicated by the indication portion based on the image data.

In the above image display method, the transparent screen can be utilized as both an image display device and an acceptance device for accepting an input from the user, thereby an image display system for conducting the above image display method can be simplified.

The above and further objects and novel features of the invention will more fully appear from the following detailed description when the same is read in connection with the accompanying drawings. It is to be expressly understood, however, that the drawings are for purpose of illustration only and not intended as a definition of the limits of the invention.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

In the drawings,

FIG. 7 is an explanatory views showing image examples displayed on the transparent screen and FIG. 7 (*a*) shows an image of a rear plane in the transparent screen, FIG. 7 (*b*) shows an image of the rear plane in the transparent screen, the image including a shadow, and FIG. 7 (c) shows an image shown in FIG. 7 (b) after a binarization process is done.

DETAILED DESCRIPTION OF THE PREFERRED EMBODIMENTS

Figure 1:
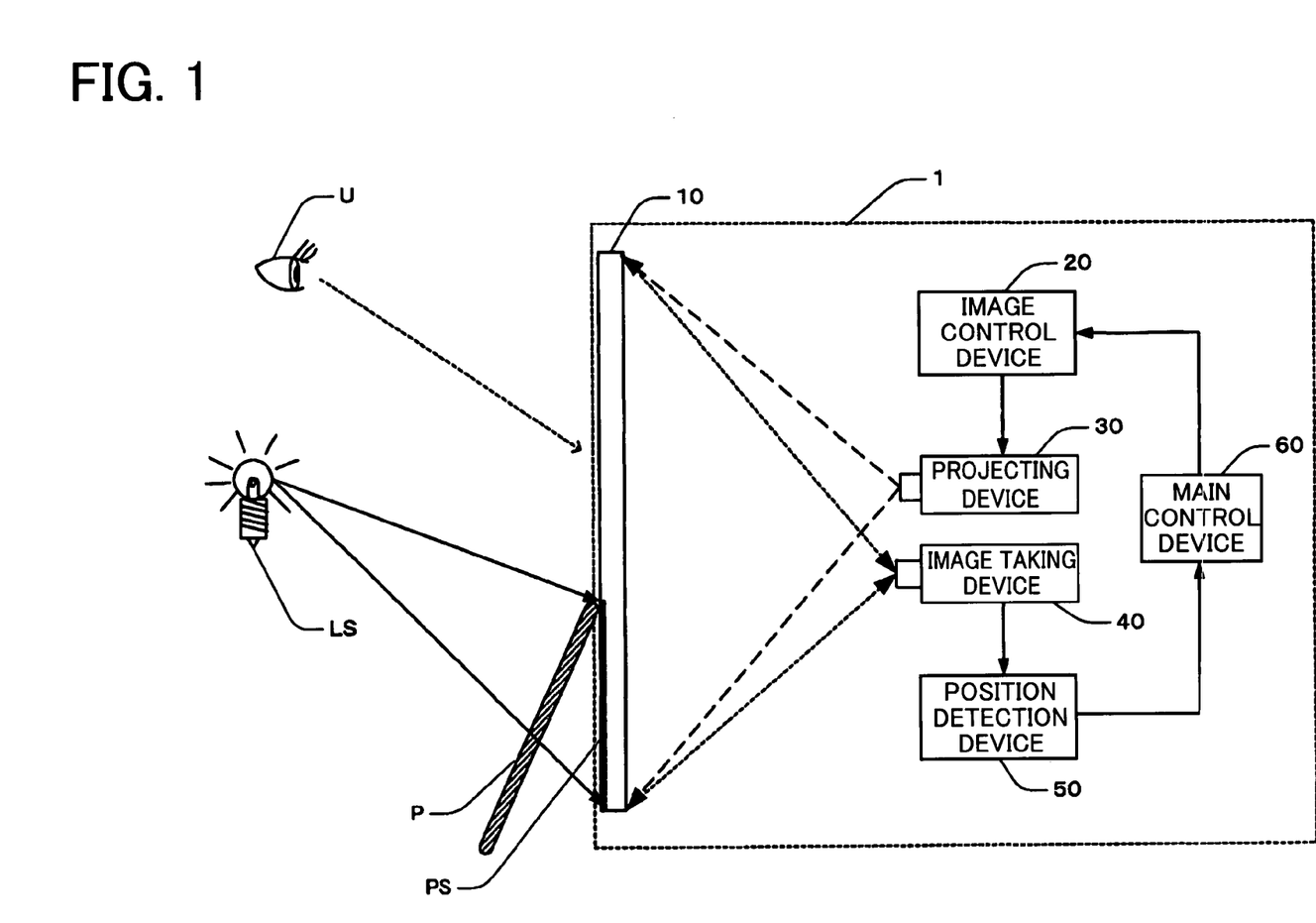
FIG. 1 is an explanatory view showing a basic construction of an image display system.

Hereinafter, the embodiment embodying the present invention will be described with reference to the drawings. FIG. 1 is an explanatory view showing a basic construction of the image display system according to the present invention.

This image display system is constructed from: a screen device 10 on which an image is focused; an image control device 20 for supplying image data; a projecting device 30 for projecting the image on the screen device 10 based on the image data supplied from the image control device 20; an image taking device 40 for taking a rear image of the screen device 10, the rear image being formed so as to include a shadow PS of an indication portion P; a position detection device 50 for receiving image data of the rear image of the screen device 10 output from the image taking device 40 and for determining the position of the shadow PS of the indication portion P based on the image data and outputting the position information; and a main control device 60 for transmitting to the image control device 20 the image to be projected on the screen device 10 through the projecting device 30, based on the position information output from the position detection device 50.

The screen device 10 has transparency, therefore light coming to both the front and rear planes can pass therethrough. The screen device 10 is, for example, a transparent screen for a liquid crystal projector. And when a user U sees the front plane of the screen device 10, the user U sees as if the optical image projected toward the rear plane of the screen device 10 by the projecting device 30 is focused on the screen device 10, as a result, the user U can see and recognize the image projected by the projecting device 30 corresponding to the image data.

The indication portion P is the indicating tool or means through which the user U indicates a desirable portion of the image displayed on the front plane of the screen device 10. For example, the indication portion P is the user's hands (including arms) or an indicating stick. The indication portion P is illuminated by a light source LS, thus the shadow PS of the indication portion P is seen on the screen device 10. Since the screen device 10 has transparency, the shadow can be seen on the rear plane of the screen device 10 when the user U sees the rear plane of the screen device 10. Here, the light source LS may be the natural light source such as the sun or may be an illumination device provided in the circumference (indoor) that the image display system 1 is arranged or may be an illumination device such as a fluorescent tube arranged in the image display system 1.

The projecting device 30 is constructed form an optical projecting system which can project the optical image on the screen device 10 based on the image data. For example, the projecting device 10 is the liquid crystal projector (DLP (Digital Liquid crystal Projector)). Preferably, the light source LS is a light source which emits white light. And based on that white light passes through the screen device 10, the area in the shadow PS of the indication portion P is blackly seen on the rear plane of the screen device 10 and the area other than the shadow PS is whitely seen, therefore an image similar to the black and white image can be obtained.

The image taking device 40 is a device to produce image data of the rear plane of the screen device 10 and is, for example, constructed from a digital camera, a digital video camera, a CCD camera unit and the like.

The image control device 20 is a device having the position detection device 50, the main control device 60, a calculation processing device (CPU), a main memory (RAM), a read only memory (ROM), an input and output device (I/O) and an external memory device such as a hard disc device if necessary, and is, for example, constructed from an information process device such as a computer, a work station, a LSI chip and the like. And it is stored in the ROM or the hard disc device programs to operate the information process device as the image control device 20, the position detection device 50 or the main control device 60, and these programs are stored in the main memory and the CPU executes these programs, thereby the image control device 20, the position detection device 50 or the main control device 60 are realized by the information process device. Further, it is not necessary to store the above programs in the memory device provided in the information process device, and the programs may be provided from the external device (for example, a server of ASP (Application Service Provider) and the provided programs may be stored in the main memory.

The image control device 20, the position detection device 50 and the main control device 60 may be realized by an individual information process device, respectively and one information process device may function as the image control device 20, the position detection device 50 and the main control device 60.

The image control device 20 stores plural image data to show to the user U and reads out the necessary image data corresponding to the instruction from the main control device 60. Further, the image control device 20 conducts image process if necessary and provides the image data to the projecting device 30.

The position detection device 50 receives the image data of the rear plane in the screen device 10 output from the image taking device 40 and conducts the image process necessary for the above image data, thereby the position detection device 50 detects the position of the shadow PS of the indication portion P and outputs such detected position data as the position information. As the image process, there exist a threshold process to extract the area of the shadow SP and an edge process to extract an outline of the shadow PS. The position detection device 50 produces the position information of the shadow PS by utilizing the area of the shadow PS obtained by the edge process and the coordinate position information of pixels of the outline.

The main control device 60 has function to wholly control operation of the image display system 1 and instructs the timing to output which image data to the image control device 20 and transmits the instruction to change the image data to the image control device 20 corresponding to the position information of the shadow PS from the position detection device 50.

According to the image display system 1, it can be provided the technology through which the image displayed on the screen device 10 can be changed corresponding to the position indicated by the use U through the indication portion P. That is to say, the image display system 1 utilizes the screen device 10 not only as an image display device but also an input device to input the position information by the use U.

The above image display system 1 has merits according to the above characteristic points, as follows.

According to the image display system 1, the screen device 10 functioning as the image display device can be also used as the operation portion, therefore it can be realized reduction of cost, omission of parts and simplification of construction thereof.

According to the image display system 1, it is utilized the characteristic that the shadow PS formed on the screen device 10 by the indication portion P becomes darker and darker corresponding that the indication portion P approaches to the screen device 10 closer and closer and the shadow PS becomes thinner and thinner corresponding that the indication portion P leaves from the screen device 10, therefore the position of a part (usually top) of the indication portion P, which approaches to the screen device 10, can be correctly determined.

And comparing with the technology that the position of the indication portion P is determined by directly taking the image of the indication portion P on the front plane of the screen device 10 through the image taking device 40, the image display system 1 has the merit that there is no fear that preciseness of the position determination drops, even if the circumference of the indication portion P is projected on the screen device 10.

Next, the concrete embodiment of the present invention will be described.

Figure 2:
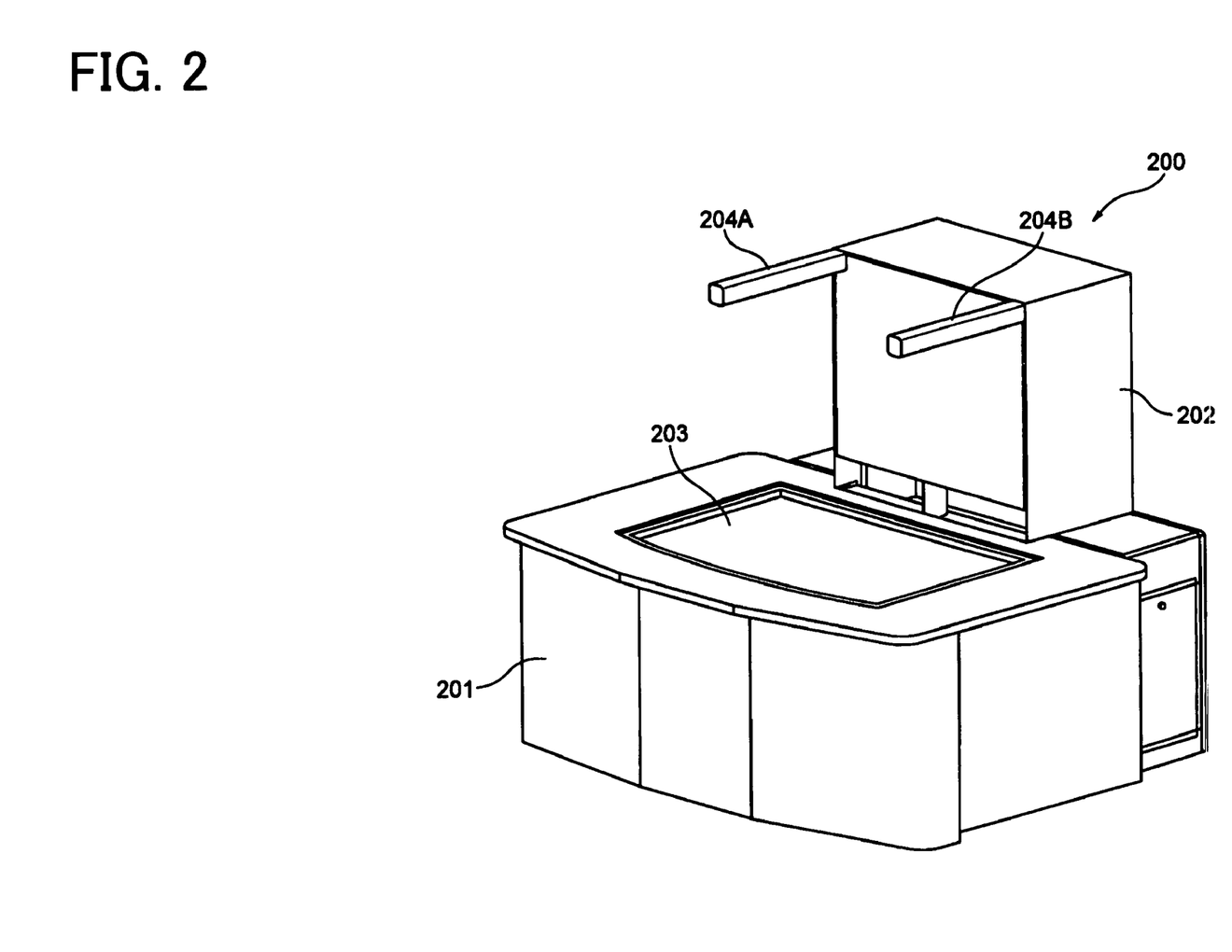
FIG. 2 is a perspective view showing a gaming machine utilizing the image display system.

FIG. 2 is a perspective view of a gaming machine utilizing the image display system 1 according to the present invention. Here, although the gaming machine is explained as a device that the user U plays a baccarat game, the gaming machine according to the concrete embodiment can correspond to various games such as a poker game, a black jack game, a bridge game, a roulette game, for which the image display system 1 of the present invention can be adopted, in addition to the baccarat game.

The gaming machine 200 of the concrete embodiment has a table portion 201 and a front display portion 202 disposed on the table portion 201 at a back side thereof.

The table portion 201 stores the optical system and the information process devices constructing the image display system 1 therein. On an upper central position of the table portion 201, an opening is formed and a transparent screen 203 constructing the screen device 10 is arranged in the opening. The transparent screen 203 functions as an upper display to display game image for the user U. Here, an upper plane of the transparent screen 203 is covered and protected by a transparent plate member such as a glass panel and the like, thus the transparent screen 203 is not broken and soiled even if the user U touches the upper display by hands which become the indication portion P.

At both upper sides of the front display portion 202, luminescent tubes 204A, 204B as the light source LS are arranged, thereby the shadow SP of the indication portion P is reflected on the transparent screen 203. Here, it is not necessary to arrange the luminescent tubes 204A, 204B according to the state indicated in FIG. 2 and the luminescent tubes 204A, 204B may be arranged at any positions so long as the shadow PS of the indication portion P is reflected on the transparent screen 203. And if illumination devices are arranged in a place (room) where the gaming machine 200 is installed so that the shadow PS of the indication portion P is reflected on the transparent screen 203, there is no problem if the luminescent tubes 204A, 204B are not provided.

Figure 3:
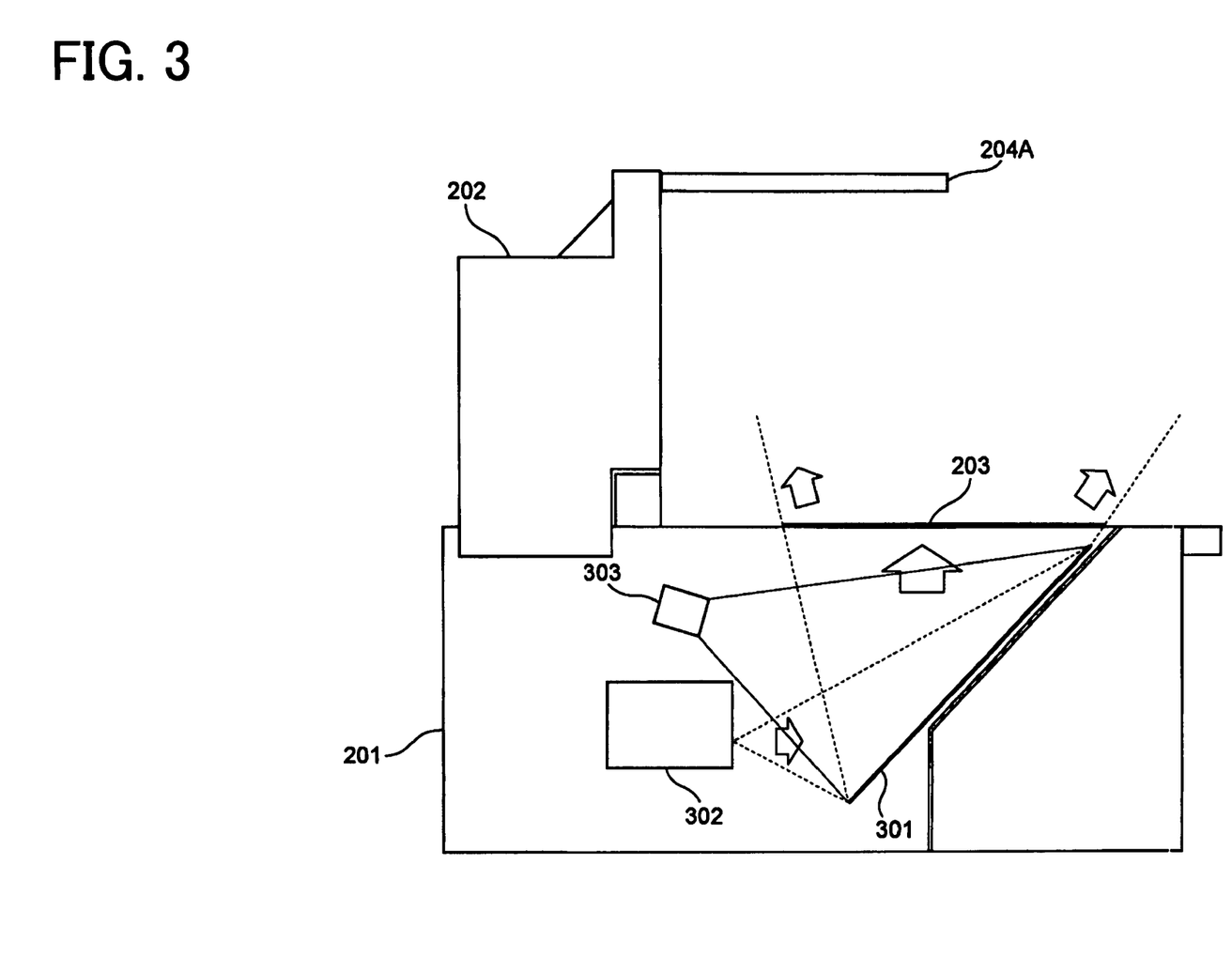
FIG. 3 is a schematic view showing an optical system constructing the image display system.

FIG. 3 is an explanatory view showing an example that an optical system constructing the image display system 1 is arranged, the image display system 1 being installed within the table portion 201.

At the central position of the table portion 201, the transparent screen 203 is fixed while being protected by the glass plate. Under the transparent screen 203, a mirror 301 is arranged in an oblique state. At a position facing to the mirror 301, a digital liquid crystal projector (abbreviated as "DLP" hereinafter) 302 and a digital video camera 303 corresponding to the image taking device 40 are fixed. The mirror 301 reflects the image projected from the DLP 302 toward the transparent screen 203. Both the distance to the DLP 302 and the angle of reflection plane of the mirror 301 are adjusted so that the reflected image is projected with a desirable size. Similarly, the mirror 301 reflects the image of the rear plane of the transparent screen 203 toward the digital video camera 303. The distance to the digital video camera 303 and the angle of reflection plane of the mirror 301 against the transparent screen 203/the digital video camera 303 are adjusted so that the digital video camera 303 can take the image of the rear plane of the transparent screen 203.

Figure 4:
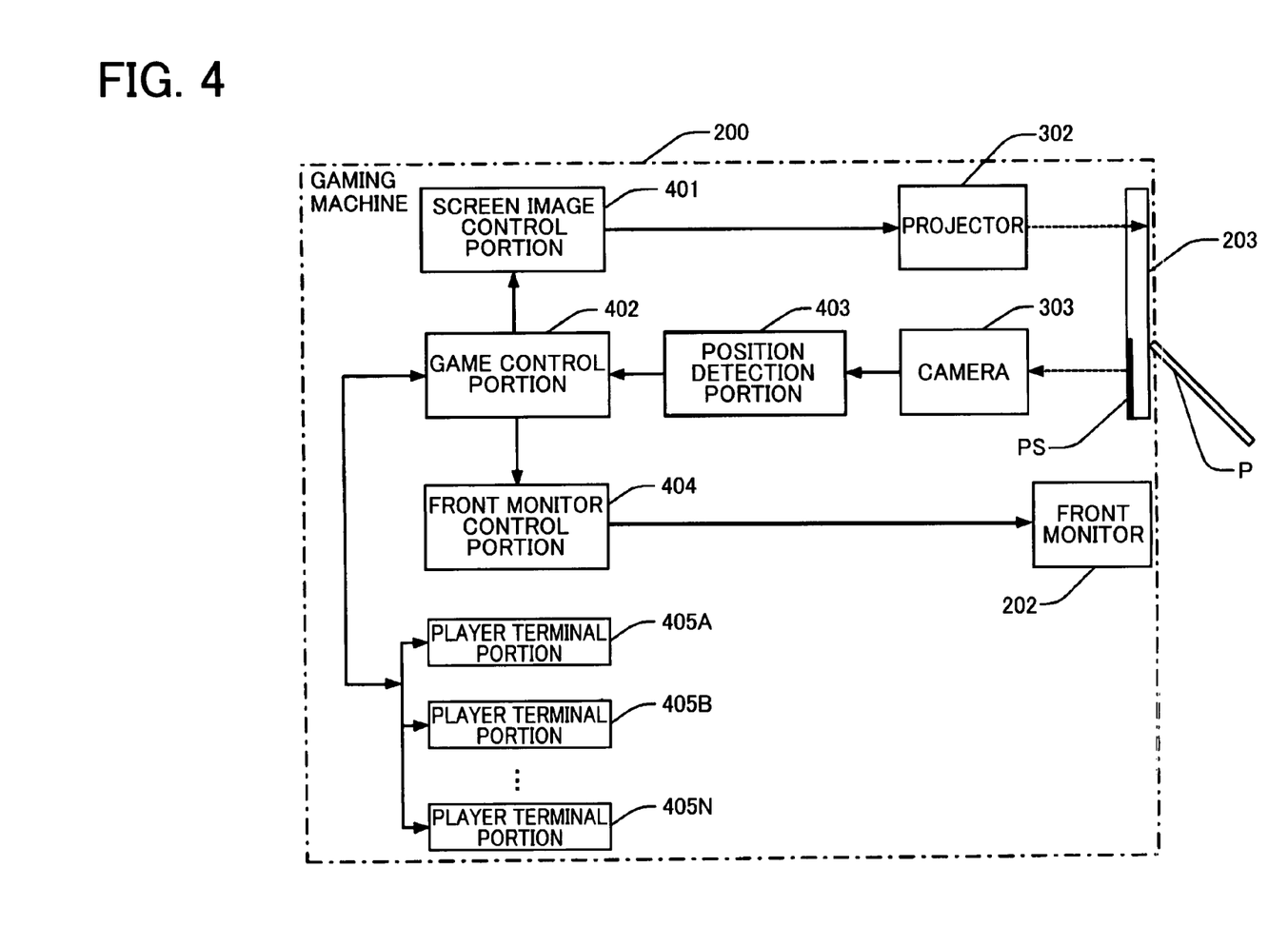
FIG. 4 is a block diagram showing an electrical construction of the gaming machine.

Next, the electrical construction of the gaming machine 200 will be described. FIG. 4 is a block diagram showing the electrical construction of the gaming machine 200.

As shown in FIG. 4, the transparent screen 203 is provided in the gaming machine 200. The DLP 302 corresponding to the projecting device 30 optically projects the image concerning with the game on the transparent screen 203. A screen image control portion 401 corresponding to the image control device 20 provides the image data (abbreviated as "front plane image data" hereinafter) to the DLP 302. And the digital video camera 303 corresponding to the image taking device 40 takes the image of the rear plane of the transparent screen 203 and outputs the image data (abbreviated as "rear plane image data" hereinafter) obtained by taking the image of the rear plane of the transparent screen 203. The position detection portion 403 corresponding to the position detection device 50 processes the rear plane image data, thereby detects the position indicated by the indication portion P and outputs the position information. A game control portion 402 corresponding to the main control device 60 has function to control operation of the gaming machine 200. And the game control portion 402 instructs the timing to output which image data to the screen image control portion 401 and receives the position information from the position detection portion 403, further the game control portion 402 controls the gaming machine 200 based on the position information.

Figure 5:
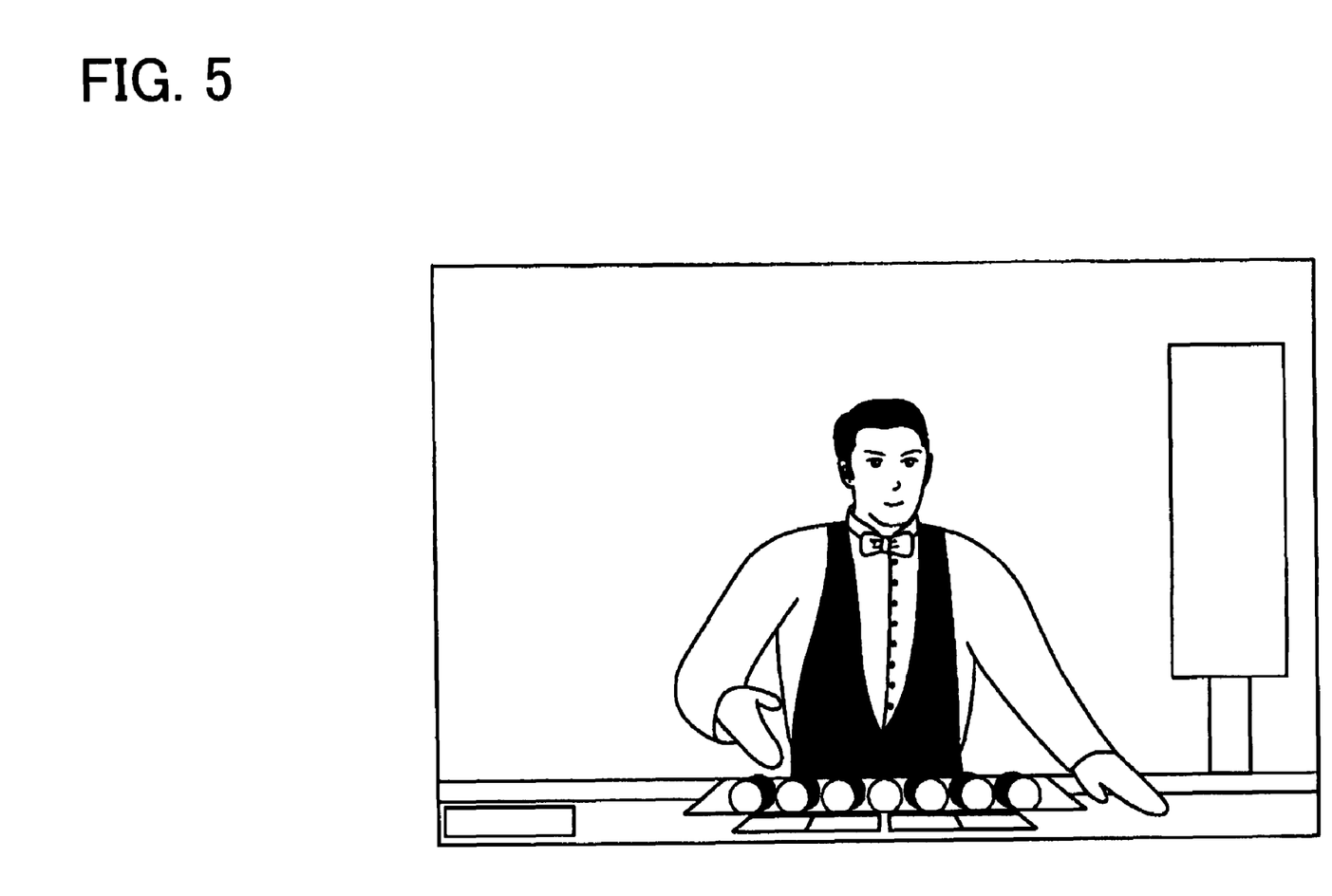
FIG. 5 is an image example displayed on a front monitor.

A front monitor control portion 404 outputs the image data (abbreviated as "monitor image data" hereinafter) of the image displayed on the front monitor 202, corresponding to the instruction from the game control portion 402. The front monitor 202 receives the monitor image data and displays thereon. The image displayed on the front monitor 202 informs a game state and a progressing state of the game to the user U, in cooperation with the image displayed on the transparent screen 203. According to the example, a dealer of the baccarat game is displayed on the front monitor 202 with a moving image. FIG. 5 is an image example displayed on the front monitor 202. In the image, the dealer of the baccarat game is displayed and it is displayed a state that distribution of cards, draw and delivery of chips by the dealer are displayed, thereby it is done the direction as if the player actually plays the baccarat game with the dealer.

Figure 6:
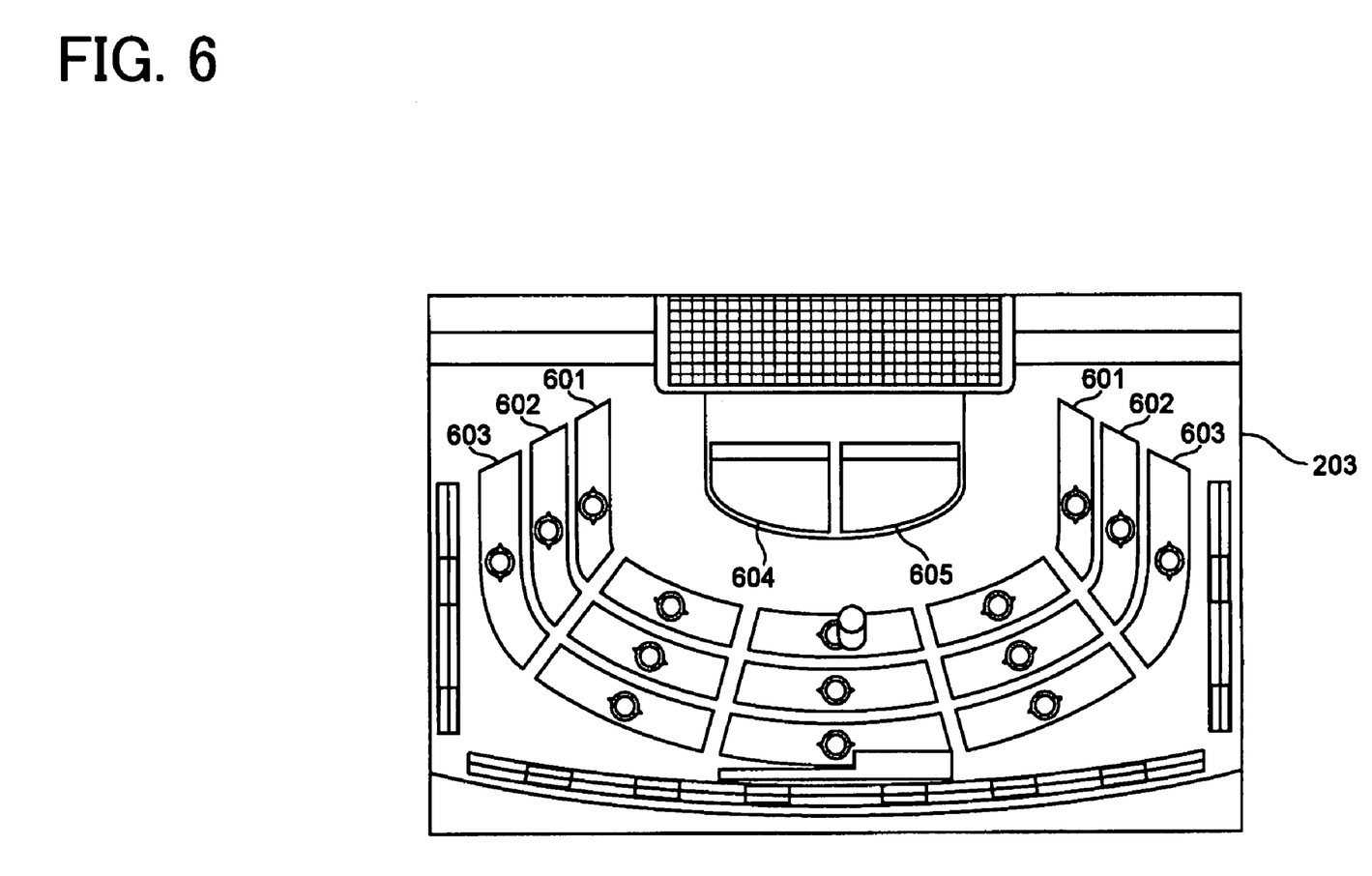
FIG. 6 is an image example displayed on a transparent screen of the gaming

Next, an image example displayed on the transparent screen 203 will be shown in FIG. 6. FIG. 6 is an explanatory view showing an image example displayed on the transparent screen 203 of the gaming machine 200. In this example, it is shown an image schematically showing of a baccarat table on the transparent screen 203. In the baccarat table shown in the example, areas 601, 602 and 603 to bet for "BANKER", "PLAYER" and "DRAW" respectively are displayed for each of five players. When the player points any of the areas 601, 602 and 603 by his or her hand as the indication portion P, it is input to the gaming machine 200 that the player bets for any of "BANKER", "PLAYER" and "DRAW". Here, chip number/money/credit number to be betted can be determined by the player through bet buttons arranged on a player terminal portion 405. And a pile of chips belong to the player is displayed on the transparent screen 203, and when the player points any of "BANKER", "PLAYER" and "DRAW" by the indication portion P, the image is changed so that chips corresponding to the chip number betted to any of the areas 601, 602 and 603 are moved to any of the areas 601, 602 and 603 from the pile of chips.

And on the transparent screen 203, it is displayed areas 604 and 605 to which the dealer distributes cards of "BANKER", "PLAYER" and card images are displayed on the areas 604, 605.

A plurality of player terminal portions 405A~405N are connected to the game control portion 402. Each of the player terminal portions 405 has bill validation function and bet input function. Here, the bill validation function is function that coins, bills, prepaid card, credit card are received from the player and these are dealt as the credit (chips) used in the gaming machine 200 and further payout of the credit (chips), which the player owns at the time that payout instruction is done by the player, is conducted corresponding to the player's payout instruction. And the bet input function is function that the bet number/money/the credit number in the game are determined. The player conducts the game through the player terminal portion 405 and the indication portion P.

Next, it will be described detection process that the player's hand as the indication portion P is detected from the rear plane image data of the rear plane in the transparent screen 203.

Figure 7A:
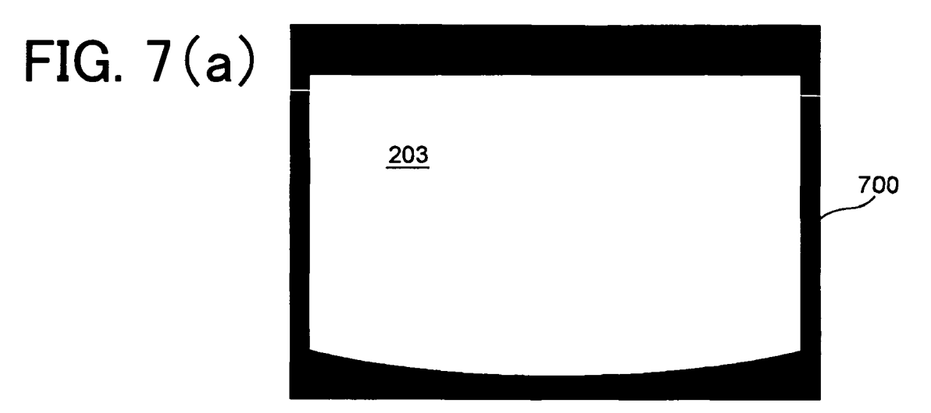

FIG. 7 (a) shows an image example obtained by taking the image of the rear plane in the transparent screen 203 through the mirror 301 by the video camera 303, in a state that the shadow PS of the indication portion P is not displayed on the transparent screen 203. The Video camera 303 is adjusted so as to take not only the image of the transparent screen 203 but also the image of circumference portion 700 enclosing the transparent screen 203. The circumference portion 700 corresponds to, for example, a fixing frame to fix the transparent screen 203 to a ceiling plate of the table portion. It is preferable that the color of the circumference portion 700 is colored in black color or dark color near black color.

When the player sees with naked eyes, there will be a case that the image displayed on the front plane of the transparent screen 203 shown in FIG. 6 can be seen from the rear plane of the transparent screen 203. Thus, the exposure of the video camera 303 is adjusted and set so that the image displayed on the front plate of the transparent screen 203 becomes white and disappears from the transparent screen 203. Here, in a case that the video camera 303 has automatic exposure adjusting function, the exposure is adjusted corresponding to the circumference portion 700 colored in black color or dark color near black color, therefore the image displayed on the front plane of the transparent screen 203 can be automatically removed even if exposure adjustment is not especially done.

Figure 7B:
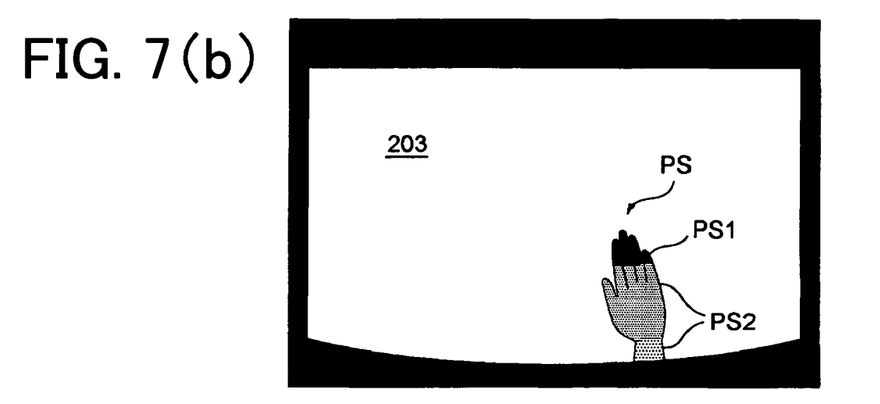

FIG. 7 (b) shows an image example obtained by taking the image of the rear plane in the transparent screen 203 through the mirror 301 by the video camera 303, in a state that the shadow PS of the indication portion P is reflected on the transparent screen 203. In this image, the shadow PS of the hand as the indication portion P exists on the transparent screen 203. In this image example, the shadow PS comprises a complete shadow PS1 with dark color and a half shadow PS2 with thin color. The complete shadow PS1 and the half shadow PS2 are produced due to distance to the transparent screen 203. Here, the shadow of the top portion of the hand (top side of the hand) exists closer to the transparent screen 203 and becomes the complete shadow PS1. And the shadow of the rear portion of the hand (arm side of the hand) separates from the transparent screen 203 and becomes the half shadow PS2. On the basis of difference between the complete shadow PS1 and the half shadow PS2, the top of the indication portion P can be determined.

Figure 8:
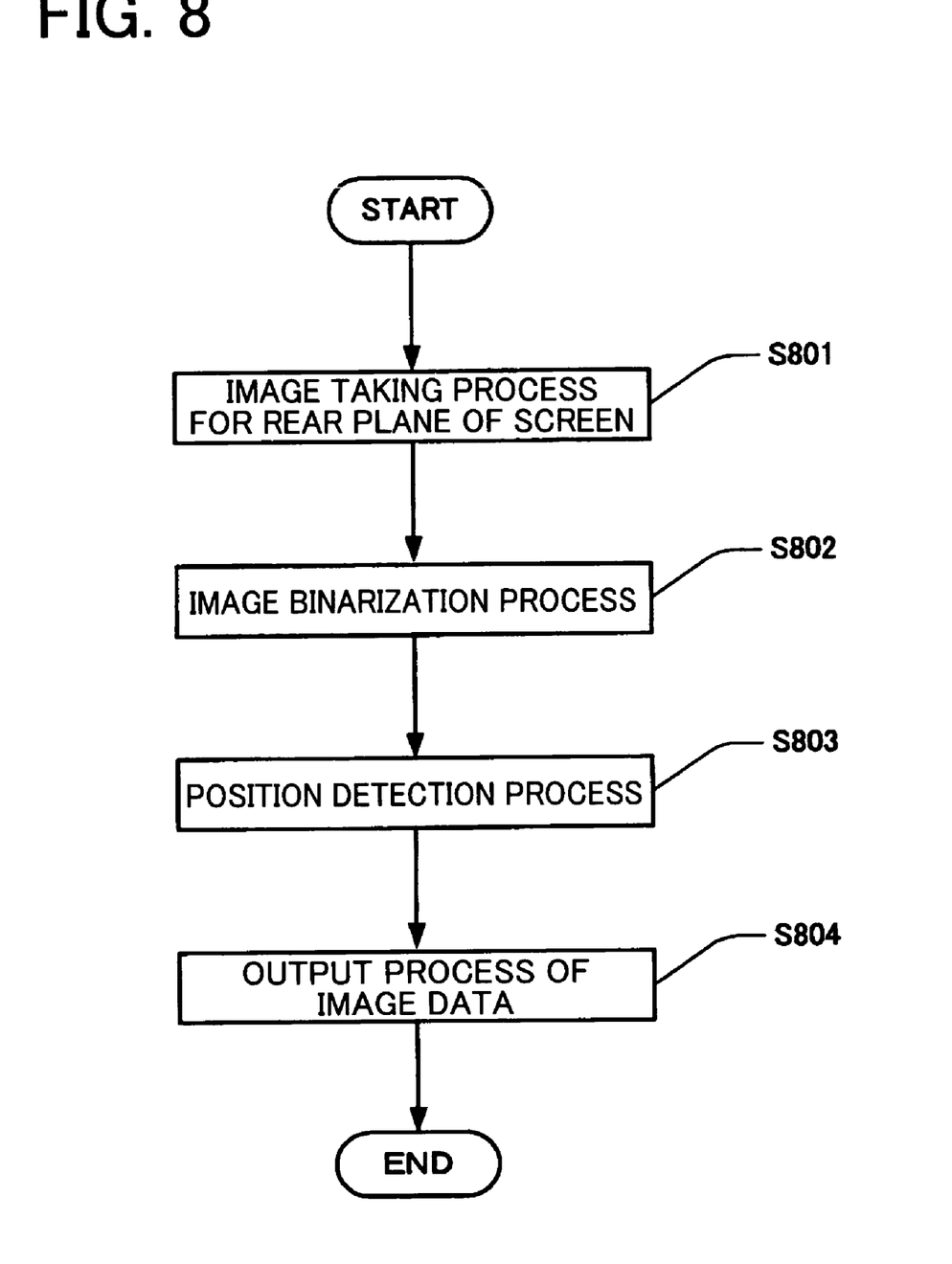
FIG. 8 is a flowchart of the position detection process in which the position detection of the indication portion P is done by utilizing the rear plane image data.

FIG. 8 is a flowchart of the position detection process in which the position detection of the indication portion P is done by utilizing the rear plane image data.

At first, it is executed the process for taking the rear plane image of the transparent screen 203 (step S801). That is to say, the video camera 303 takes the rear plane image of the transparent screen 203 through the mirror 303 and outputs the image shown in FIG. 7 (b) as the rear plane image data to the position detection portion 403.

Figure 7C:
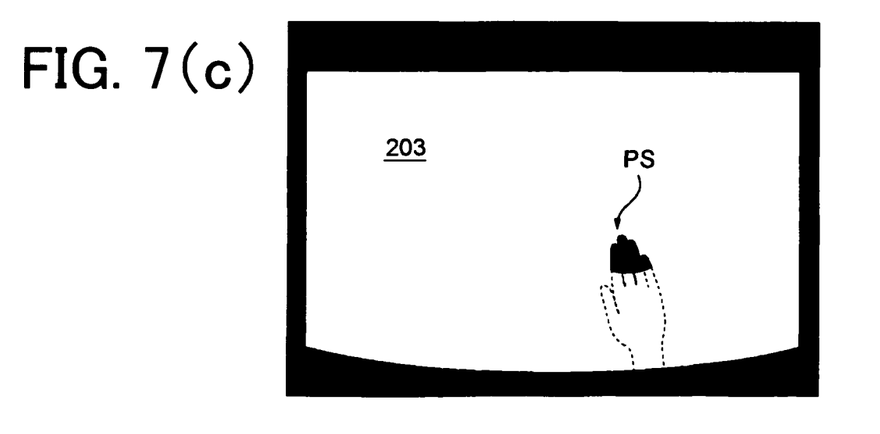

Receiving the rear plane image data, the position detection portion 403 executes a binarization process of the rear plane image data (step S802). FIG. 7 (c) is a conceptual view when the rear plane image data are displayed after the binarization process is done. In the shadow PS of the indication portion P, the thin shadow like the half shadow PS2 is removed and the top area of fingers is remained, accordingly it becomes very clear the position to which the indication portion P points. When the binarization process is conducted, a threshold value is voluntarily set so that the top of the indication portion P is specified. An optimum value of the threshold varies corresponding to circumstance (brightness of illumination device) around the gaming machine 200, therefore it is preferable to seek the optimum value of the threshold after the gaming machine 200 is installed and a trial run of the gaming machine 200 is done.

Next, the position detection portion 403 executes the position detection process based on the rear plane image data after the binarization process is done (step S803). Concretely, the position detection portion 403 obtains the coordinate values (x, y values) of the pixels having black values based on the rear plane image data after the binarization process is done and produces the position information based on the coordinate values. The position information may be the coordinate value of the pixel corresponding to the summit of the top area. Or the mean value or central value of the coordinate values of all pixels having the black values may be selected as the position information.

Lastly, the position detection portion 403 outputs the position information produced in step S803 to the game control portion 402 (step S804). The game control portion 402 conducts a necessary game process based on the position information received. For example, the game control portion 402 determines the position information as pointing of any of the areas 601, 602 and 603 to bet to "BANKER", "PLAYER" or "DRAW", and conducts control so that the chip image designated is displayed.

As mentioned in the above, it can be realized the gaming machine 200 in which the transparent screen 203 as the screen device 10 is utilized as both the image display device and the input device.

And in the gaming machine 200, the position detected by the position detection portion 403 is accepted as an input information from the user, and the information accepted can be used for a voluntary processes including an image display process such as a change process for the image displayed by the DLP 302, a start and stop process of sounds and music. Therefore, it can be realized the gaming machine 200 with the image display system through which interaction can be done with the user.

Further, in the gaming machine 200, the position detection portion 403 conducts the binarization process (S802) of the image data and detect the position indicated by the indication portion P based on the image data after the binarization process is done. According to this, the top area of the indication portion P can be detected by utilizing a density difference between a complete shadow PS1 and a half shadow PS2 in the shadow PS formed by the indication portion P and conducting the binarization process. Therefore, the position indicated by the indication portion P can be correctly detected.

And further, the gaming machine 200 has the light source LS for emitting white light to the indication portion P and the front plane of the transparent screen 203.

By utilizing the above light source LS, the rear plane image of the transparent screen 203 becomes an image in which color components are removed like a black and white image, thereby position detection of the indication portion P can be handled as a process of the black and white image including the image of the indication portion P. Thus, machine power of the gaming machine 200 necessary for the image process can be reduced in comparison with a case that the position detection is done by a color image process.

And further, in the gaming machine 200, the digital video camera 303 takes the rear image of the transparent screen 203 and a circumference portion 700 of the transparent screen 203, and the circumference portion 700 is colored in a dark color such as black color. According to this, due to difference of brightness between the transparent screen 203 and the circumference portion 700, the image with clearness can be taken and the position indicated by the indication portion P can be correctly and easily detected.

And in the position detection process S803, the image obtained by the digital video camera 303 becomes the black and white image, thereby processing ability necessary for producing the binarized image from the black and white image can be lowered.

The present invention may be adopted for all devices or systems in which the input acceptance by the user is done by utilizing the image displayed on the display device. For example, the present invention may be adopted for the image display system for presentation, the demonstration device for sales promotion, in addition to the gaming machine.

What is claimed is:

1. An image display system comprising:
    a projector for projecting a first image;
    a transparent screen on a rear plane of which the first image projected by the projector is focused, and on a front plane of which a second image formed by and indication portion indicating the first image is reflected;
    an image taking device for taking a rear plane image of the second image and outputting image data thereof; and
    a position detector for detecting a position indicated by the indication portion based on the image data,
    wherein the second image comprises a complete shadow portion and a half shadow portion, and
    wherein the complete shadow portion and the half shadow portion are formed by a reflection of the indication portion.

2. The image display system according to claim 1, wherein the position detected by the position detector is accepted as an input information from a user.

3. The image display system according to claim 1, wherein the position detector conducts a binarization process of the image data and detects the position indicated by the indication portion based on the image data after the binarization process is done.

4. The image display system according to claim 1, further comprising:
    a light source for emitting white light to the indication portion and the front plane of the transparent screen.

5. The image display system according to claim 4, wherein the light source is arranged to create the second image, and
    wherein the second image comprises a shadow of the indication portion.

6. The image display system according to claim 5, wherein the indication portion is located between the light source and the transparent screen such that the shadow of the indication portion is reflected on the front plane.

7. The image display system according to claim 1, wherein the image taking device takes the rear plane image of the transparent screen and a circumference portion of the transparent screen, and wherein the circumference portion is colored in a dark color.

8. The image display system according to claim 1, wherein the second image comprises a shadow of the indication portion reflected on the front plane.

9. The image display system according to claim 1, wherein the complete shadow portion is formed by the reflection of a top portion of the indication portion positioned closer to the transparent screen.

10. The image display system according to claim 1, wherein the position detector detects the position indicated by the indication portion by determining a top portion of the indication portion based on a difference between the complete shadow portion and the half shadow portion.

11. An image display method comprising:
    projecting a first image;
    focusing the first image projected by the projector on a rear plane of a transparent screen and for reflecting a second image by an indication portion indicating the first image on a front plane of the transparent screen;
    taking a rear plane image of the second image and for outputting image data thereof; and
    detecting a position indicated by the indication portion based on the image data,
    wherein detecting the position indicated by the indication portion comprises detecting a top portion of the indication portion based on a density difference between a complete shadow portion and a half shadow portion formed by a shadow of the indication portion.

12. The image display method of claim 11, wherein said detecting the position indicated by the indication portion further comprises detecting a complete shadow portion and a half shadow portion from the second image.

13. The image display method of claim 12, further comprising:
    removing the half shadow portion; and
    setting the complete shadow portion as the position indicated by the indication portion.

14. The image display method of claim 12, wherein the complete shadow portion corresponds with a top portion of the indication portion located closer to the transparent screen.

* * * * *